United States Patent
Drobny et al.

(10) Patent No.: US 6,808,200 B2
(45) Date of Patent: Oct. 26, 2004

(54) METHOD FOR OCCUPANT CLASSIFICATION IN A MOTOR VEHICLE

(75) Inventors: Wolfgang Drobny, Heilbronn (DE); Rüdiger Giesel, Stuttgart (DE); Rene Wolf, Schwieberdingen (DE); Hermann Maier, Markgroeningen (DE); Reiner Marchthaler, Gingen (DE); Ralf Henne, Sachsenheim (DE); Thomas Lich, Schwaikheim (DE)

(73) Assignee: Robert Bosch GmbH, Stuttgart (DE)

( * ) Notice: Subject to any disclaimer, the term of this patent is extended or adjusted under 35 U.S.C. 154(b) by 424 days.

(21) Appl. No.: 09/954,214

(22) Filed: Sep. 18, 2001

(65) Prior Publication Data

US 2002/0096868 A1 Jul. 25, 2002

(30) Foreign Application Priority Data

Sep. 23, 2000 (DE) .......................................... 100 47 193

(51) Int. Cl.⁷ .............................................. B60R 21/32
(52) U.S. Cl. ...................... 280/735; 73/862.381; 177/4; 177/136; 180/274; 180/282
(58) Field of Search ........................ 280/735; 180/274, 180/282; 177/4, 136; 73/862.381

(56) References Cited

U.S. PATENT DOCUMENTS 6,076,853 A * 6/2000 Stanley ........................ 280/735
6,282,473 B1 * 8/2001 Steffens, Jr. .................. 701/45
6,345,839 B1 * 2/2002 Kuboki et al. ............... 280/735
6,677,538 B2 * 1/2004 Cook et al. ............... 177/25.13

OTHER PUBLICATIONS

ERL–TR–95–009, Ergonomics Research Laboratory, "The Initial Position and Postural Attitudes of Driver Occupants, Posture" by R. Brodeur, H.M. Reynolds, Kal Rayes and Yuntao Cui, MSU East Lansing, Michigan (Jun. 21, 1996).
ERL–TR–95–003, Ergonomics Research Laboratory, "The Initial Position and Postural Attitude of Vehicle Operators" by R.R. Brodeur, Yuntao Cui, Herbert M. Reynolds, MSU, East Lansing, Michigan (Aug. 15, 1995).
K. Billen, L. Federspiel, P. Schockmehl, B. Serban, and W. Scherrel's "Occupant Classification System for Smart Restrained Systems," SAE Paper, 1999, pp. 33–38.

* cited by examiner

*Primary Examiner*—Eric Culbreth
(74) *Attorney, Agent, or Firm*—Kenyon & Kenyon

(57) ABSTRACT

A method for occupant classification in a vehicle is used to extract a plurality of features from a seat profile and to assign a weight estimate to each of these features. The occupant weight and a measure of quality are determined from the different weight estimates. The measure of quality determines whether the occupant weight continues to be used as the occupant classification. The weight estimation for the feature in question is carried out via a stored function. The occupant classification can be used for a restraint system. The ischial tuberosity distance and/or the seat profile size can be used as the features.

19 Claims, 1 Drawing Sheet

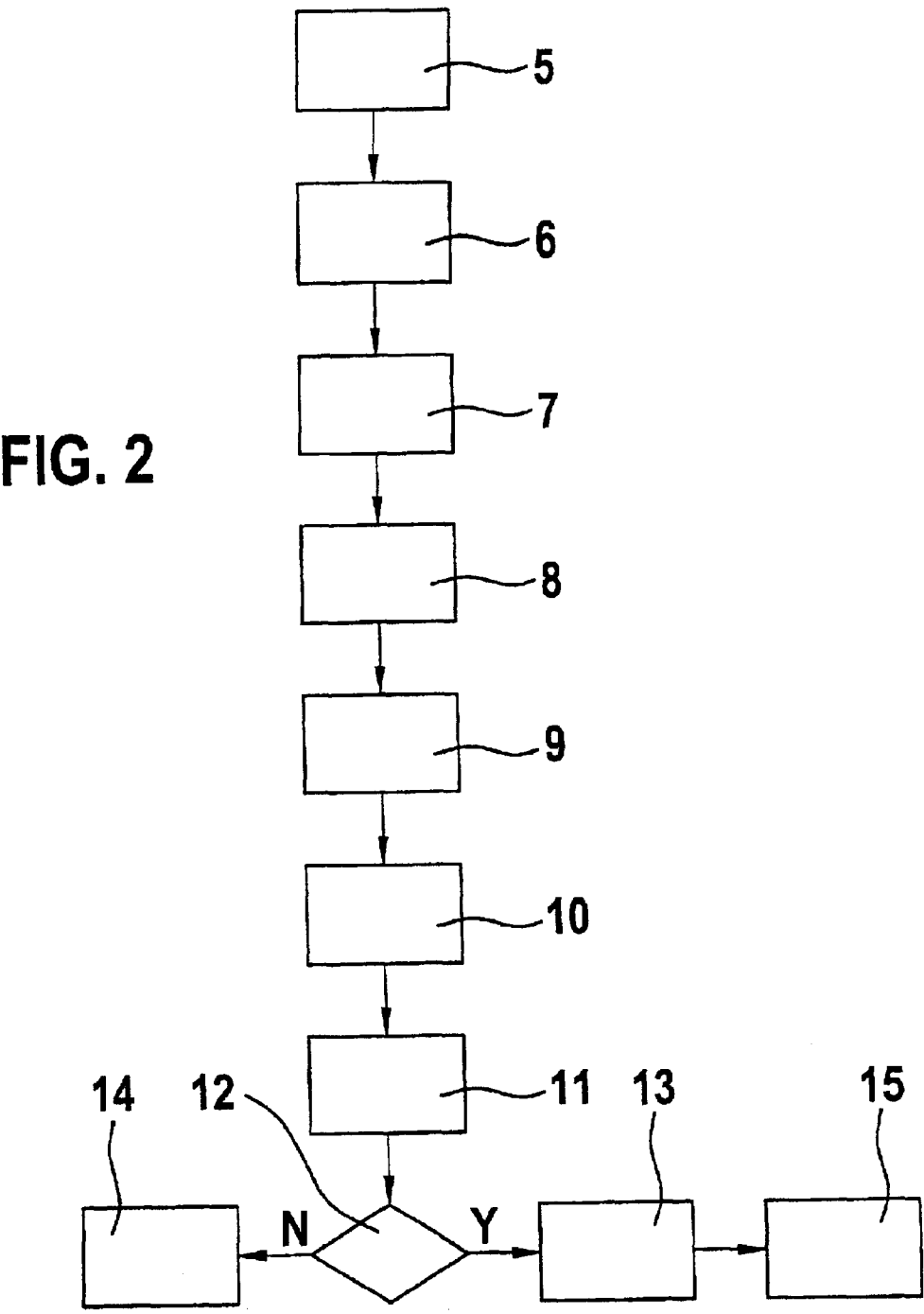

METHOD FOR OCCUPANT CLASSIFICATION IN A MOTOR VEHICLE

FIELD OF THE INVENTION

The present invention relates to a method for providing occupant classification in a motor vehicle.

BACKGROUND INFORMATION

K. Billen, L. Federspiel, P. Schockmehl, B. Serban, and W. Scherrel's "Occupant Classification System for Smart Restrained Systems," SAE Paper, 1999, pages 33–38, describes a seat mat having a sensor matrix, which is used for generating a seat profile of different persons and objects. Moreover, this seat profile is continuously checked. From this seat profile, features are determined that are used for occupant classification.

SUMMARY OF THE INVENTION

The method for occupant classification in a vehicle according to the present invention has the advantage that for every feature that was determined from the seat profile, a weight estimate is carried out for each of the features, the individual weight estimates then being used for determining the weight of the occupant and, thus, for occupant classification. Thus, it is ensured that a single feature cannot distort the occupant classification. In this context, all features are weighted equally. Furthermore, the method can, therefore, be easily expanded to a plurality of features without increasing the complexity of the method according to the present invention.

Moreover, it is advantageous that a measure of quality is used via which bad (inaccurate) seat profiles are discarded, so that there are no incorrect classifications due to bad seat profiles. In particular, this is to be viewed as a function of time, since a seat profile can exhibit poor quality for different reasons at different instants, so that it is to be assumed that the occupant classification resulting from the seat profile is faulty. The method according to the present invention, therefore, results in a reliable occupant classification and, thus, for connected systems, such as a restraint system, improved operability of these systems.

It is particularly advantageous that the weight estimate for the feature in question is calculated via a stored function that was previously experimentally determined. Thus, this function relates the feature value to a weight value. Consequently, a weight estimate for a particular feature value is possible in a simple manner.

Furthermore, it is advantageous that the occupant classification is used for a restraint system. As such, it is possible, particularly for a multi-stage airbag as the restraint system, to be activated in such a manner that none of the passengers to be protected are injured. The restraining force that the airbag exerts on the person or the object is exerted as a function of the specific occupant class. In this context, every stage of the airbag corresponds to a certain force value. The airbag exerts a greater restraining force on a heavy person than on a lighter one.

Moreover, it is advantageous that the ischial tuberosity distance and/or the seat profile size is/are used as the features. They are simple features that can be easily determined from the established seat profile. However, further features are also possible here.

Finally, it is also advantageous that a device for implementing the method according to the present invention is present, the device having a seat mat including the sensor matrix and a processor for determining features and classifying occupants. In this context, the processor is advantageously connected to the control unit for the restraint system.

BRIEF DESCRIPTION OF THE DRAWINGS

FIG. 1 shows a block diagram of the device according to the present invention.

FIG. 2 shows a flow chart of the method according to the present invention.

DETAILED DESCRIPTION

An aim of an occupant classification is reliable information regarding the object or the person sitting on the vehicle seat in question. This is necessary to detect whether an airbag is to be activated or not. Furthermore, it can consequently be determined how an airbag is to be activated. This is particularly necessary in the case of multi-stage airbags, which offer a plurality of activation possibilities. The object of such multi-stage airbags is to reduce the risk and severity of injuries caused by the airbag or airbags.

According to the present invention, a method for occupant classification in a vehicle is, therefore, used in which features are determined from a seat profile for the person or object occupying the vehicle seat and a weight estimation is performed for each of these features. An occupant weight is then determined from the different weight estimates. Furthermore, a measure of quality is determined for this occupant weight, which represents the occupant classification, the measure of quality being compared to a predefined measure of quality, i.e., a threshold value. Thus, it is determined whether the seat profile exhibits suitable quality, so that it can be estimated that the occupant classification is highly reliable. Such an improved occupant classification can be used, for example, for a restraint system, the features and weight estimate being assigned via stored functions for the respective features. For example, the ischial tuberosity distance and the seat profile size can be used as the features.

FIG. 1 shows the block diagram of the device according to the present invention. A seat mat 1 having a sensor matrix is connected to a processor 2 via a data input/output. Processor 2 is connected via a data output to a control unit 3 for restraint systems. The control unit 3 for the restraint systems is connected via a data input/output to restraint system 4. Processor 2 has an analog-digital converter, which digitalizes the measured values from the sensor matrix. Processor 2 including the analog-digital converter is accommodated in a housing and forms a control unit.

The sensor matrix in seat mat 1 sequentially supplies measured values of the individual sensors in the sensor matrix, via which processor 2 determines the seat profile of an object or a person sitting on the vehicle seat in which seat mat 1 is situated. The individual sensors are pressure-responsive resistors whose resistance decreases in response to increased pressure. The sensor matrix has rows and columns, the resistances of the rows and columns being indirectly measured, so that the seat profile can consequently be detected, and the individual sensors in the sensor matrix can be identified. Processor 2 applies voltages to the rows and columns, the voltages being selected in accordance with the principle of the balanced bridge such that no currents flow through the sensors. If a sensor is to be surveyed, the applied voltages are changed such that a current flows through the sensor in question. The sensors are surveyed in succession, so that a sequential measured-value current is generated that is digitalized by the analog-digital converter and is then used by processor 2 for calculating the resistance. Processor 2 calculates the seat profile from these resistance values for the rows and columns. In response to an increase in pressure on seat mat 1, the sensors have a decreased resistance value.

From the seat profile or directly from the calculated resistance values, processor 2 then determines characteristic features, such as the ischial tuberosity distance and the seat profile size of seat mat 1, which provide information regarding the weight of the person, or which give an indication of whether the occupant is an object.

Further assigned to processor 2 is a memory device from which processor 2 calls up functions for every feature, the functions assigning the feature value, such as the ischial tuberosity distance or the seat profile size, to a weight. These functions were experimentally determined. Thus, there are different weight estimates for the individual features, such as the ischial tuberosity distance and the seat profile size. From the weight estimates for the ischial tuberosity distance and the seat profile size, processor 2 calculates the occupant weight. Processor 2 uses a mean value generation for this purpose. The following equation can be used for estimating the occupant weight:

$$A = \sqrt{\frac{B^2 + C^2}{2}}$$

In this context, A is the occupant weight, B is the weight estimate resulting from the seat profile size, and C is the weight estimate resulting from the ischial tuberosity distance. Alternatively, it is also possible to use other average values. Other functions with which the occupant weight can be determined can also be used here.

The occupant weight is then an occupant classification that can be used for control unit 3 for restraint system 4. From the calculated weight estimates and the calculated occupant weight, processor 2 calculates the profile quality as a measure of quality. The following equation is used for this purpose:

$$Q = (1 - [\max(B,C) - \min(B,C)]/A)$$

In this instance, Q is the value for the profile quality that is compared to the predefined threshold value to determine whether the seat profile exhibits sufficient quality. Alternatively, other methods of calculation are also possible. The equation indicated here has proven to be practicable. In particular, the equations indicated here can be expanded to include additional features and their weight estimates.

In FIG. 2, the method for occupant classification according to the present invention is represented as a flow chart. In process step 5, the measured current values are acquired using the sensor matrix in seat mat 1, processor 2 sequentially changing the voltages in order to query the individual sensors. In process step 6, the measured current values of the sensor matrix are transmitted to processor 2. At the same time, these measured values of the sensor matrix are digitalized. Thus, it is ensured that processor 2 can process the measured values as digital data. In process step 7, processor 2 determines the resistance values of the sensors and the seat profile of seat mat 1 from the measured values of the sensor matrix. In process step 8, processor 2 determines the features, ischial tuberosity distance and seat profile size, from the seat profile. In process step 9, processor 2 uses the stored functions to calculate weight estimates for the individual features, ischial tuberosity distance and seat profile size. There are consequently two weight estimates. If a plurality of features were determined, then there would also be a plurality of weight estimates.

In process step 10, the occupant weight is determined from these weight estimates using the equation for generating a mean value described above. Consequently, the occupant classification takes place. In process step 11, the measure of quality is determined from the occupant weight and the individual weight estimates. In process step 12, a check is made to determine whether this measure of quality is above a predefined threshold value. If this is the case, the occupant classification continues to be used in process step 13 in order to transmit it in process step 15 to control unit 3 for restraint system 4. If the measure of quality is below the predefined threshold value, the occupant classification is discarded in process step 14. The occupant classification is also of interest for additional vehicle systems and can be transferred to them.

The occupant classification is continuously performed as a function of time. Thus, seat profiles that partly lead to bad weight estimates due to persons moving on the vehicle seat are not used for further processing for restraint systems or other systems. In a further refinement, it is possible for the threshold value for the measure of quality to be adaptable.

What is claimed is:

1. A method for occupant classification in a vehicle, comprising:

using a seat mat in a vehicle seat for the occupant classification;

generating a seat profile as a function of time, using a sensor matrix in the seat mat;

determining features on the basis of the seat profile;

performing a weight estimation for each of the features, resulting in respective weight estimates;

determining an occupant weight for the occupant classification from the respective weight estimates for the respective features;

determining a measure of quality for the occupant classification from the weight estimates and the occupant weight; and continuing to use only occupant classifications whose measure of quality is above a predefined threshold value.

2. The method according to claim 1, further comprising calculating the weight estimates for each of the respective features using a function stored for the respective feature.

3. The method according to claim 1, wherein the occupant classification is used for a restraint system.

4. The method according to claim 1, wherein the features include at least one of an ischial tuberosity distance and a seat profile size.

5. The method according to claim 1, further comprising calculating the weight estimates for each of the respective features using a function stored for the respective feature, wherein the occupant classification is used for a restraint system, and the features include at least one of an ischial tuberosity distance and a seat profile size.

6. The method according to claim 1, wherein the seat mat includes the sensor matrix that is coupled to a processor via a data input/output, the processor is coupled via a data output to a control unit for a restraint system, the control unit is coupled via a data input/output to the restraint system, the processor includes an analog-digital converter to digitize measured values from the sensor matrix, and the processor and the analog-digital converter are accommodated in a housing that forms another control unit.

7. The method according to claim 1, wherein an average occupant weight is estimated by averaging a first weight estimate based on a seat profile size, and a second weight estimate based on an ischial tuberosity distance.

8. The method according to claim 1, wherein the average occupant weight is determined as follows:

$$A = \sqrt{\frac{B^2 + C^2}{2}},$$

where A is the average occupant weight, B is the first weight estimate based on the seat profile size, and C is the second weight estimate based on the ischial tuberosity distance.

9. The method of claim 1, wherein the measure of quality is a profile quality, which is determined using as follows: Q=(1−[max(B, C)−min(B,C)]/A), where Q is a value for the profile quality, A is an average occupant weight, B is a first weight estimate based on the seat profile size, and C is a second weight estimate based on the ischial tuberosity distance.

10. A device for occupant classification in a vehicle, comprising:
   a seat mat situated in a vehicle seat for the occupant classification, the seat mat having a sensor matrix for generating a seat profile as a function of time; and
   a processor for performing the following:
      determining features on the basis of the seat profile,
      performing a weight estimation for each of the features, resulting in respective weight estimates,
      determining an occupant weight for the occupant classification from the respective weight estimates for the respective features,
      determining a measure of quality for the occupant classification from the weight estimates and the occupant weight, and
      continuing to use only occupant classifications whose measure of quality is above a predefined threshold value.

11. The device according to claim 10, wherein the processor is coupled to a control unit for a restraint system.

12. The device according to claim 10, further comprising calculating the weight estimates for each of the respective features using a function stored for the respective feature.

13. The device according to claim 10, wherein the occupant classification is used for a restraint system.

14. The device according to claim 10, wherein the features include at least one of an ischial tuberosity distance and a seat profile size.

15. The device according to claim 10, wherein the processor operates to determine the weight estimates for each of the respective features using a function stored for the respective feature, the occupant classification is used for a restraint system, and the features include at least one of an ischial tuberosity distance and a seat profile size.

16. The device according to claim 10, wherein the seat mat includes the sensor matrix that is coupled to the processor via a data input/output, the processor is coupled via a data output to a control unit for a restraint system, the control unit is coupled via a data input/output to the restraint system, the processor includes an analog-digital converter to digitize measured values from the sensor matrix, and the processor and the analog-digital converter are accommodated in a housing that forms another control unit.

17. The device according to claim 10, wherein the measure of quality is a profile quality, which is determined using as follows: Q=(1−[max(B,C)−min(B,C)]/A), where Q is a value for the profile quality, A is an average occupant weight, B is a first weight estimate based on the seat profile size, and C is a second weight estimate based on the ischial tuberosity distance.

18. The device according to claim 10, wherein an average occupant weight is estimated by averaging a first weight estimate based on a seat profile size, and a second weight estimate based on an ischial tuberosity distance.

19. The device according to claim 18, wherein the average occupant weight is determined as follows:

$$A = \sqrt{\frac{B^2 + C^2}{2}},$$

where A is the average occupant weight, B is the first weight estimate based on the seat profile size, and C is the second weight estimate based on the ischial tuberosity distance.

* * * * *